W. F. HARBRECHT.
PAPER FEED AND CUT-OFF.
APPLICATION FILED MAR. 11, 1911.
1,039,124.
Patented Sept. 24, 1912.
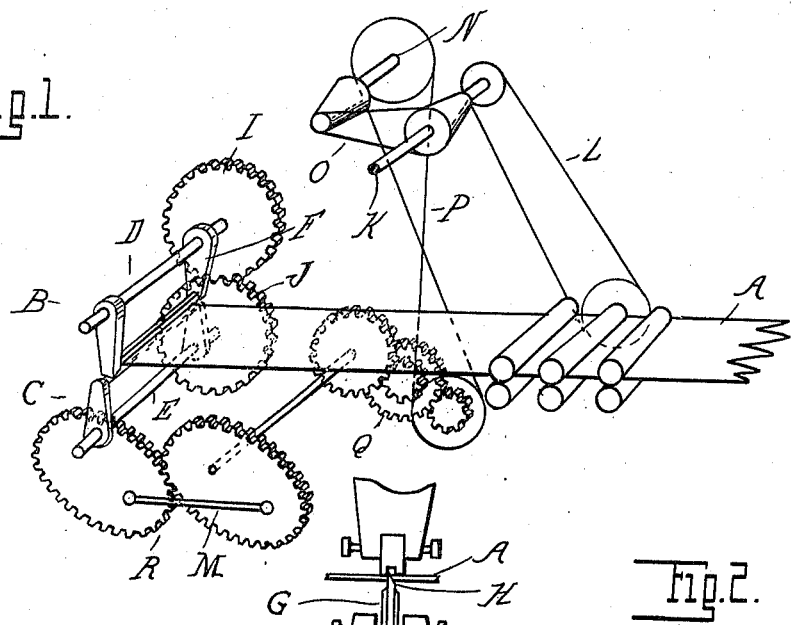
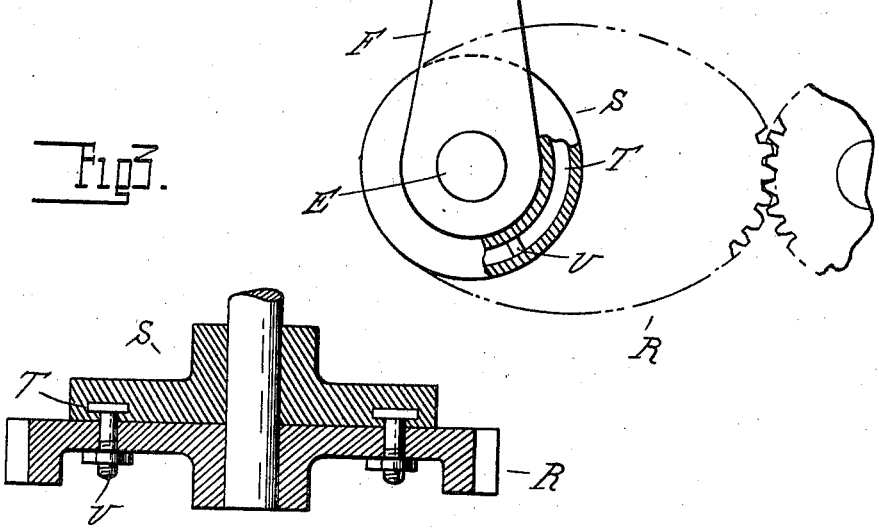
Witnesses
Inventor
William F. Harbrecht
By Whittemore Hulbert & Whittemore
Attys

UNITED STATES PATENT OFFICE.

WILLIAM F. HARBRECHT, OF SANDUSKY, OHIO, ASSIGNOR TO HINDE & DAUCH PAPER COMPANY, OF SANDUSKY, OHIO, A CORPORATION OF OHIO.

PAPER FEED AND CUT-OFF.

1,039,124.  Specification of Letters Patent.  Patented Sept. 24, 1912.

Application filed March 11, 1911. Serial No. 613,795.

*To all whom it may concern:*

Be it known that I, WILLIAM F. HARBRECHT, a citizen of the United States of America, residing at Sandusky, in the county of Erie and State of Ohio, have invented certain new and useful Improvements in Paper Feeds and Cut-Offs, of which the following is a specification, reference being had therein to the accompanying drawings.

The invention relates more particularly to the manufacture of paper board where the material is delivered from the machine at a constant and uniform feed.

It is the object of the invention to provide means for cutting off the strip into sections, without interfering with the continuous movement, and further to vary the lengths of the sections thus cut.

To this end the invention consists in the construction of a rotary cutter and the means for changing its timing, while maintaining the same speed of movement during the cutting operation.

In the drawings:—Figure 1 is a diagrammatic perspective view of machine. Fig. 2 is a sectional elevation of the cutter. Fig. 3 is a cross section through the gear.

A is a strip of paper or paper board which is continually fed from the forming machine (not shown) at a uniform speed. The cut-off for this strip comprises a pair of rotary coöperating cutter members B and C. These as shown consist of rotary shafts D and E above and below the plane of feed. Arms F project from said shafts and bars G are at the outer ends of said arms. One of the bars G carries a clamp for the knife bar H, while the other bar is provided with a coöperating shearing edge. The shafts D and E are rotated at the same speed but in opposite directions, by intermeshing gear wheels I and J at one end thereof. Thus in operation the knife bar and the coöperating shearing edge will operate once in each cycle to sever the paper strip A fed therebetween.

For driving the feed mechanism and the cut-off mechanism in proper timed relation, mechanism is provided including variable speed transmission, the construction being as follows: K is a motor or drive shaft from which the power is derived. L is a sprocket and chain connection from the shaft K to one of the rollers N which deliver the paper strip, the coöperating rollers being driven at the same speed through intermeshing gears (not shown). N is a shaft parallel to the shaft K and driven therefrom at different speeds through the medium of a variable speed transmission indicated at O. The specific construction of this variable speed transmission is not essential to my invention and I have therefore omitted showing the same in detail. From the shaft N power is transmitted to the shafts D and E through suitable transmission train which as shown comprises the belt P the step down train of gears Q and the intermeshing elliptical gears R. The purpose of the elliptic gears is to transmit rotary motion to the shafts D and E varying in speed at different points in the cycle but uniform in successive cycles. The amount of variation in the speed produced by these elliptical gears is equal to the maximum amount of variation in speed which may be obtained by adjustment of the variable speed transmission O. The elliptical gears are also adjustable, rotatable with respect to the shafts on which they are mounted, and the arrangement is such that by properly adjusting these gears variations in the speed produced by adjustment of the variable speed transmission O may be compensated for, with the result that the speed of movement of the cut-off at the point of operation in the cycle may be maintained constant. In detail construction each of the gears R is loosely sleeved upon its shaft and is arranged adjacent to the head S keyed or otherwise fixedly secured to the shaft. This head S is provided with a concentric under cut, slot T in the face adjacent to the gear and headed bolts U, engaging those slots passing through apertures in the gear and when tightened will clamp said gear to the head. The gears R are preferably linked together by a rod M which connects the face of the ellipses opposite those in alinement with the shafts. This link will maintain the gears constantly in mesh during the cycle.

With the construction described in operation the continual feed strip may be severed into sections of any desired lengths within the range of adjustment of the machine. To make adjustment the variable speed transmision O is first adjusted to change the speed of the transmission from the shaft N to the shafts D and E; this will alter the time interval between successive cuts and as the speed of feed is uniform the lengths of the sections will be correspondingly altered. If however, no further adjustment were made, the speed of travel of the knife at the time of cut-off would not correspond to that of the paper strip with the inevitable result that the strip would be torn. To adjust the speed of the knife to correspond to that of the strip while in contact therewith, the bolts U are loosened and the gears R are rotatably adjusted upon their shafts to the proper point, which may be indicated by graduations on the heads or any other suitable means. The bolts are then tightened to secure the gears in this relation and in operation the speed of the knife will be accelerated or retarded to correspond with the speed of the strip, although the time of the cycle will be unchanged.

What I claim as my invention is:

1. The combination with a strip feeding mechanism having a constant and uniform feed, of a rotary cut-off, a mechanism connecting said cut-off and said feed mechanism including a variable speed transmission, means for producing variable speeds within the cut-off cycle, and means of adjustment therefor to compensate for adjustments in said transmission and to maintain uniform speed of the cut-off at the point of operation.

2. The combination with a strip feeding mechanism having a constant and uniform feed, of a rotary cut-off, a mechanism connecting said cut-off including a variable speed transmission, a pair of intermeshing elliptical gears having their cycles coincident with that of the cut-off, and means for adjusting said gears to compensate for adjustment in said transmission and to maintain uniform speed of operation of the cut-off.

In testimony whereof I affix signature in presence of two witnesses.

WILLIAM F. HARBRECHT.

Witnesses:
SIDNEY FROHMAN,
CHAS. N. KIEFER.